Feb. 16, 1971  V. JENEY  3,563,643
OPTICAL COMPENSATOR
Filed Jan. 2, 1968  3 Sheets-Sheet 2
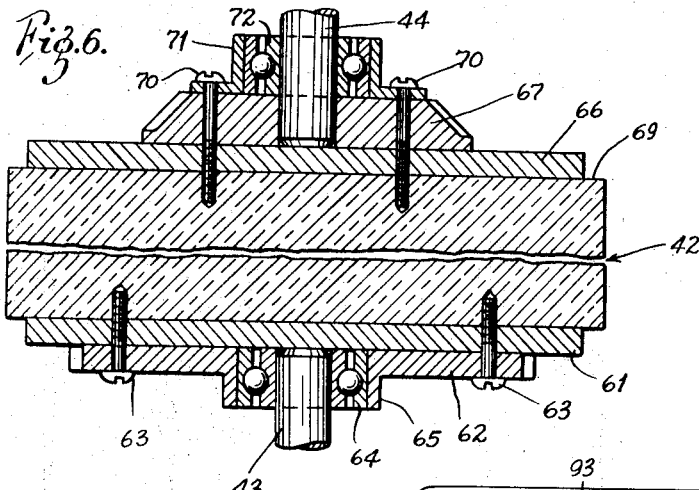
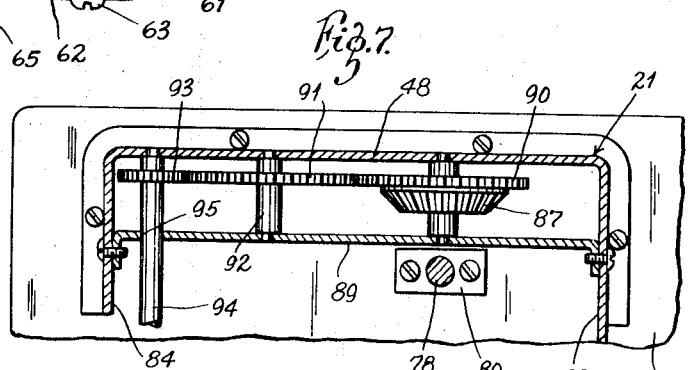
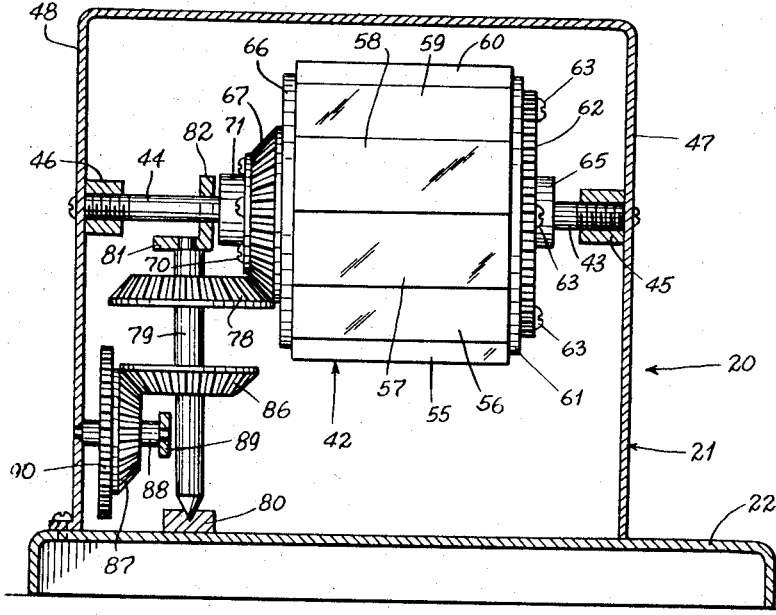
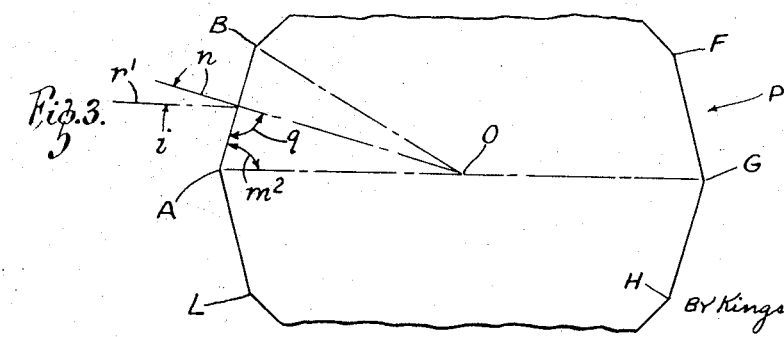
INVENTOR:
VIKTOR JENEY,
By Kingsland, Rogers, Ezell, Eilers & Robbin
ATTORNEYS Feb. 16, 1971 V. JENEY 3,563,643
OPTICAL COMPENSATOR
Filed Jan. 2, 1968 3 Sheets-Sheet 3
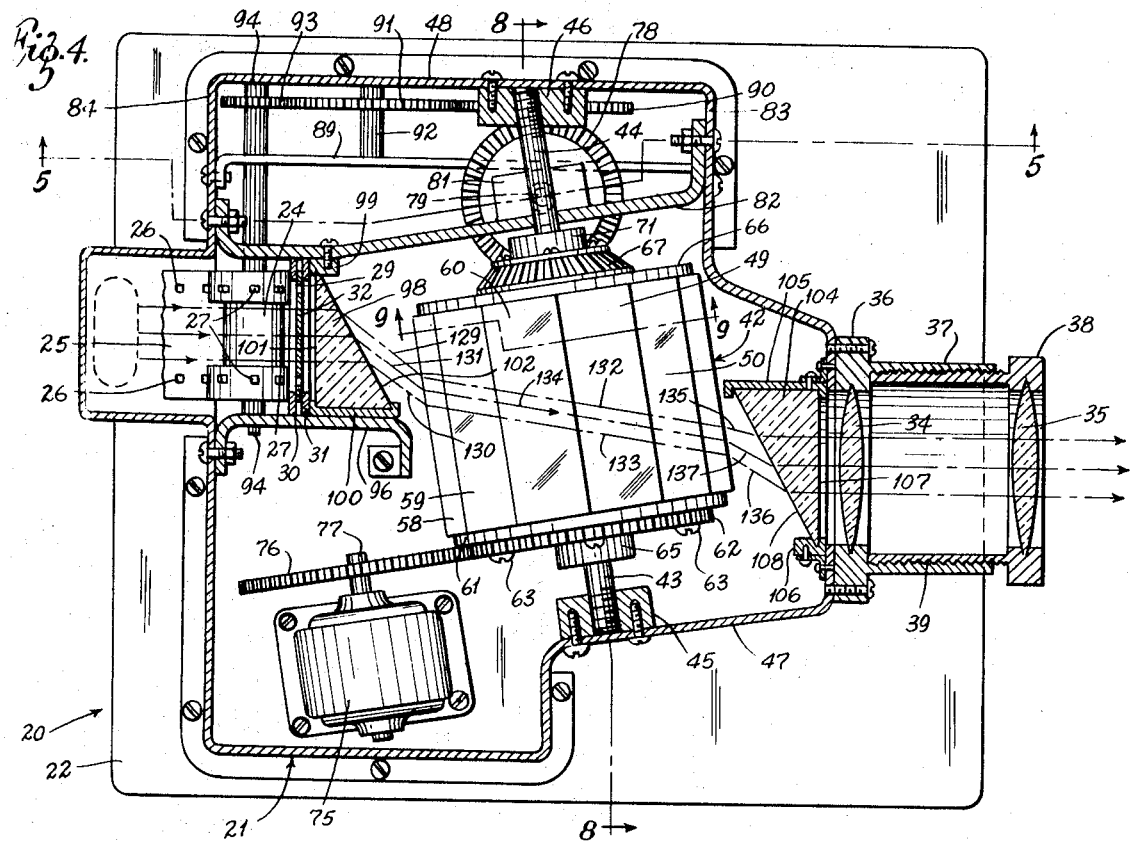
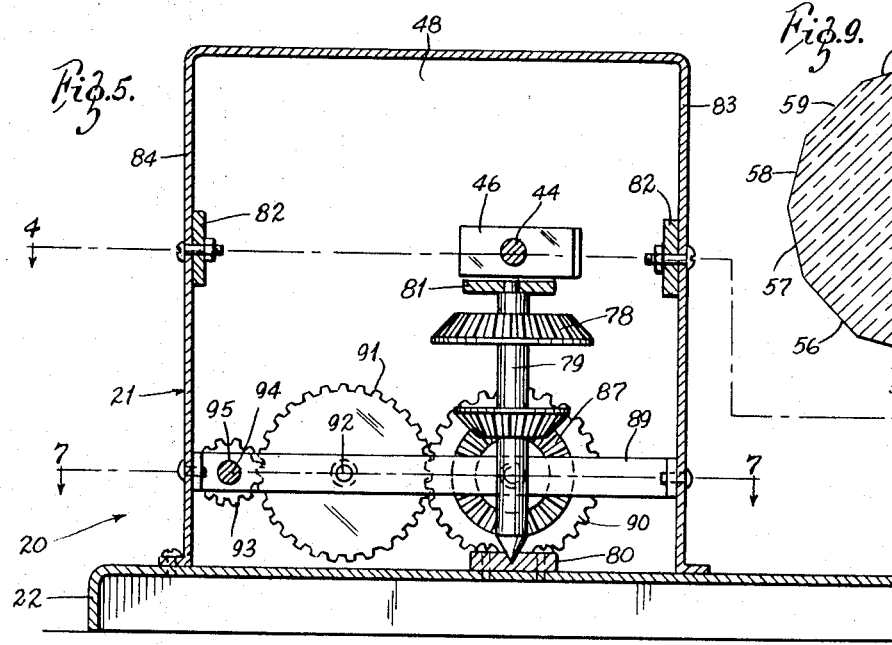
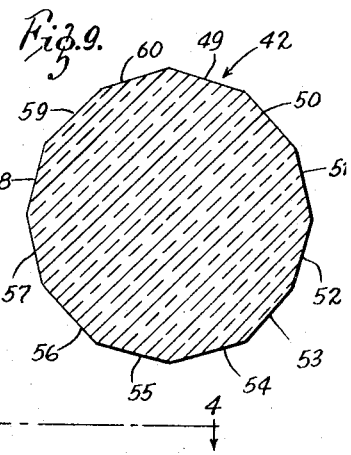
INVENTOR:
VIKTOR JENEY,
BY Kingsland, Rogers, Ezell, Eilers & Robbins
ATTORNEYS

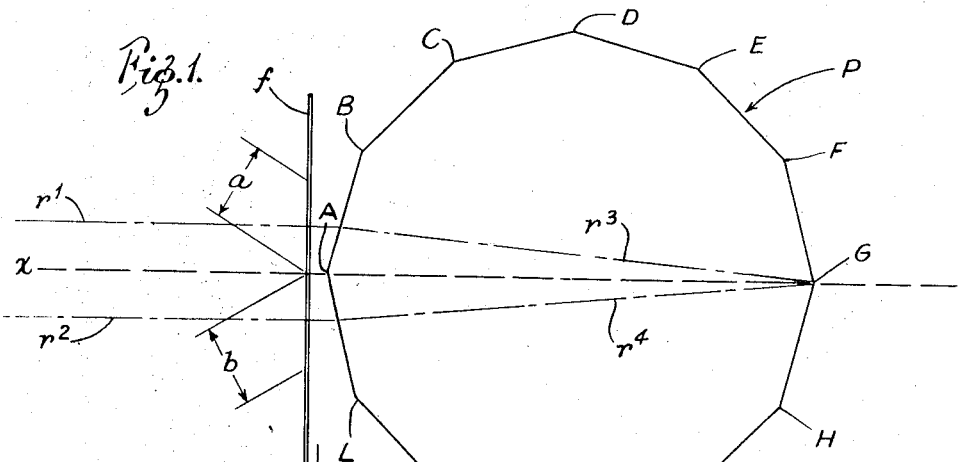
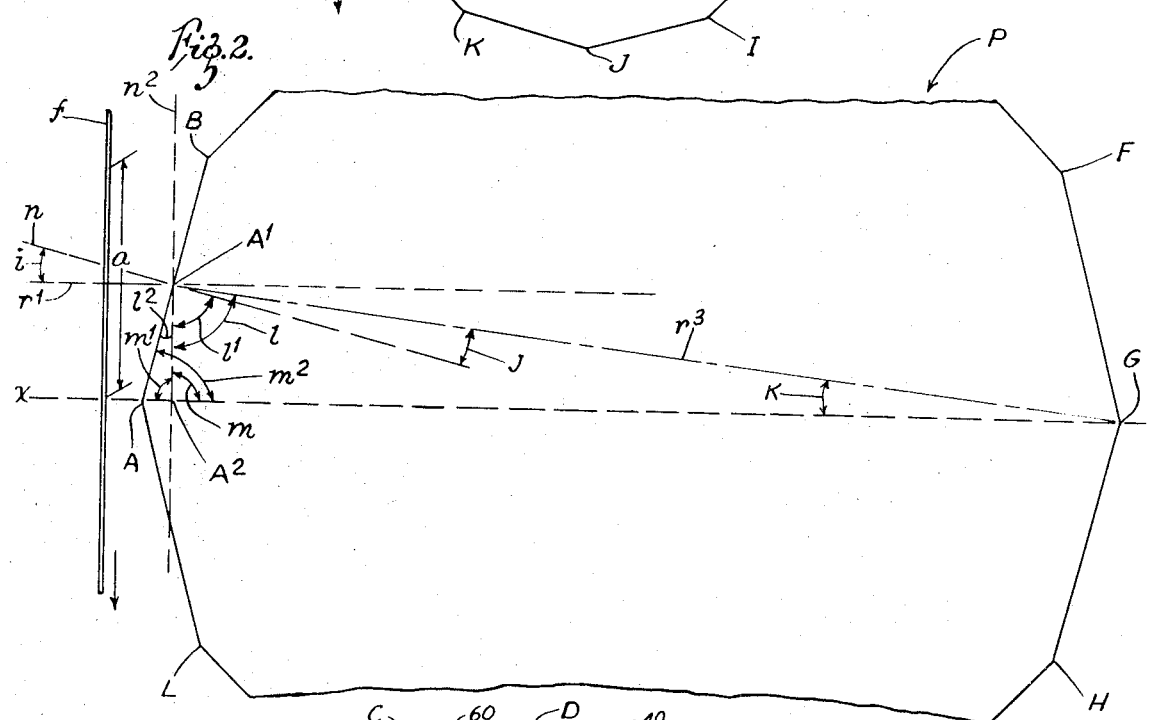
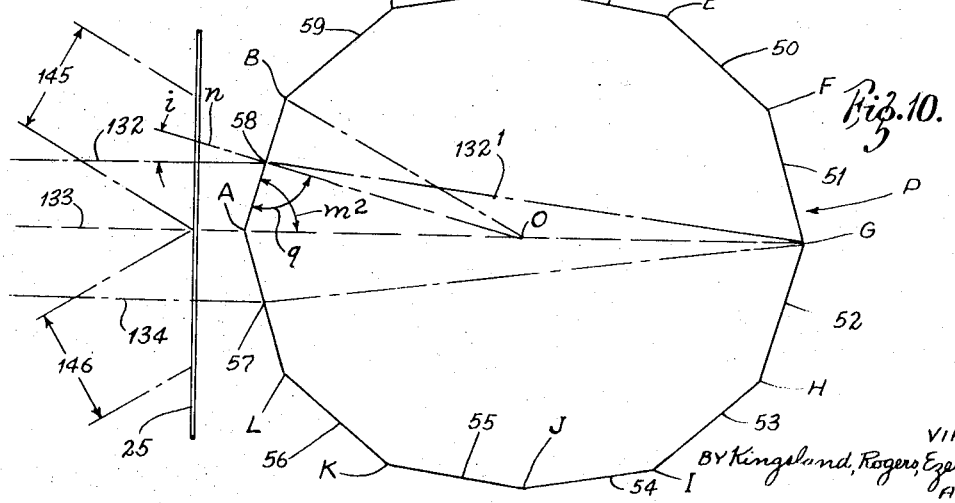

United States Patent Office 3,563,643
Patented Feb. 16, 1971

3,563,643
OPTICAL COMPENSATOR
Viktor Jeney, 15 Beverly Place, St. Louis, Mo. 63112
Filed Jan. 2, 1968, Ser. No. 694,990
Int. Cl. G03b *41/08*
U.S. Cl. 352—119                                    11 Claims

ABSTRACT OF THE DISCLOSURE

An optical compensator to enable continuous and uninterrupted motion of movie film in a movie projector, camera or viewer. A rotating multi-faced prism is oriented with its axis inclined to the direction of the rays passing through the film and lenses to etablish a greater effective prism diameter, thereby enabling use of a prism with faces equal in height to the height of the picture sections of the film. The prism enables the projection of stationary images from a film advanced with a uniform speed, synchronized with the rotational speed of the prism so that at all times the deviation of the beam of light caused by the refraction through the prism is equal with and opposite in direction to the displacement of the film. Triangular light refracting prisms on opposite sides of the rotary prism permit more compact construction of the optical compensator.

BRIEF DESCRIPTION OF THE INVENTION

This optical compensator has a housing within which a film driving mechanism and rotatable multi-faced prism are mounted. The purpose of the invention is to make the prism rotatable at a speed synchronized with the movement of the film so that the corners of the prism will always coincide with the dividing lines between the picture sections of the film and the consecutive faces of the prism refract the rays corresponding to consecutive picture sections of the film to produce a stationary image of the moving film frames and produce thereby a projection without any optical errors.

Many efforts have been made to incorporate rotating prisms for enabling continuous motion of movie film. Examples of some of these efforts are disclosed in various U.S. patents as follows: No. 2,004,120 granted June 11, 1935; No. 2,013,661 granted Sept. 10, 1935; No. 2,056,966 granted Oct. 13, 1936; No. 2,278,781 granted Apr. 7, 1942; No. 2,298,045 granted Oct. 6, 1942; No. 2,498,580 granted Feb. 21, 1950; No. 2,952,183 granted Sept. 13, 1960; No. 3,259,450 granted July 5, 1966. While the foregoing patents show the general way in which a rotating prism refracts rays and might be used with continuously moving film, none of them provides an effective, satisfactory solution to the need for an undistorted, non-flickering projected image.

In the efforts of the prior art, the prisms used have necessarily been of improper diameter which caused flickering, astigmatism and aberration in the projected image. This is because of the refractive index of the materials used and because of the diameters inherent in the polygonal shapes used. In short, with the refractive indices of available materials and the geometric relationship between the heights of the faces and the diameter of any equilateral pirsm, it has been impossible to use a prism in which the height of each face is equal to the height of each film frame. Prior efforts to solve these problems have been directed largely to the incorporation of devices for masking certain parts of the projections from the prism which do not contain the projected image from the film frame, or have involved special and expensive prism designs, all unsatisfactory.

The principle of this compensator is a Plexiglas or glass equilateral planparallel prism, with refraction index: Plexiglas 1.49, borosilicate crown glass 1.51, flint glass 1.65, adjusted according to the refraction index of the material used in a certain inclined angle to the optical axes of the projection, thereby increasing the effective working diameter of the prism. The result of this inclined angle is that the height of each face of the prism can be made equal to the height of the picture sections of the film.

The angle of inclination between the axis of the rotating prism and the plane of the film can be reduced by the incorporation of triangular prisms on each side of the rotating prism. These triangular prisms refract the light rays, passing through the film, in a transverse direction to the direction of the motion of the film, so that these refracted rays approach the rotating prism at the angle to the plane of its faces, which is required for utilization of the effective working diameter of the prism according to the angle of inclination of the prism. The incorporation of these triangular prisms also permit a more compact construction of the device.

Some of the advantages of this optical compensator are that the heights of the faces of the prism are equal with the height of the picture sections or frames of the film thereby making possible perfect synchronization between the linear speed of the film and the circumferential speed of the prism. Optical errors in the projection are eliminated without any masking, causing problems in prior art devices. Better conditions for the synchronization of the sound track and the corresponding picture sections are possible. The motion picture projector or camera is noiseless. The life of the film is increased by providing a steady flow of the film instead of intermittent motion, used in some of the prior art projectors and cameras. The manufacturing cost of the device is lowered by the use of Plexiglas as material for the prisms and by the simplicity of the mechanism.

BRIEF DESCRIPTION OF THE DRAWINGS

FIG. 1 is a schematic end view of a twelve-sided prism, illustrating certain geometric requirements;

FIG. 2 is a fragmentary end elevation view of the necessary prism of FIG. 1, showing a calculation of the prism diameter as used in the prior art;

FIG. 3 is a fragmentary end elevation view of the prism of FIG. 1, showing the calculation for the heights of the faces of the prior art prism;

FIG. 4 is a horizontal sectional view of a movie projector with the optical compensator of the invention, taken along the line 4—4 of FIG. 5;

FIG. 5 is a vertical view in section taken along the line 5—5 of FIG. 4;

FIG. 6 is an enlarged fragmentary view in section, taken through the prism axis and mount therefor;

FIG. 7 is a fragmentary view in section, taken along the line 7—7 of FIG. 5;

FIG. 8 is a view in section taken along the line 8—8 of FIG. 4;

FIG. 9 is a view in section through the prism taken along the line 9—9 of FIG. 4; and FIG. 10 is a sectional fragmentary view of a prism used in this invention taken parallel to the light rays showing the refracted rays passing through the prism and the effective diameter of the prism.

According to this invention, a motion picture projector, camera, or viewer of the non-intermitted type has a rotating multi-faced prism with its longitudinal axis inclined to the direction of the projection to enable the projection of stationary images from a film advanced with a uniform speed, without optical errors through the synchronized rotation of the prism with the film so that in any moment, the deviation of the beam of light, caused by the refraction of the prism, is equal with and opposite in direction to the displacement of the film. To accomplish this result it is necessary to achieve nearly perfect synchronization of the circumferential speed of the prism with the linear speed of the film so that each of the corners of the rotatable prism are aligned with a space between two adjacent picture frames as the film moves through the film gate. In other words, the height of each of the prism faces must be equal, or nearly equal, to the height of the picture frames. It is also necessary for the prism diameter to be such that the light rays passing through the middle of two neighboring picture sections or frames of the film coincide in the opposite corner of the prism, at the moment when two opposite corners of the prism intersect with the optical axis of the projection.

With the rotating prism mounted as disclosed in the prior art patents (the longitudinal axis of the prism perpendicular to the incident rays) it is impossible to construct a prism made from conventional materials having the necessary face heights and diameter. This is because the indices of refraction of the conventional materials are too low.

For example, a prism made of flint glass, which has the highest index of refraction of the conventional materials (1.65), would have face heights considerably greater than the heights of the picture frames in order to have the necessary diameter, making proper synchronization impossible. While it is true that the desired result can be achieved with materials having higher indices of refraction, such as for example diamond, such a prism would be prohibitively expensive.

To illustrate this problem using the prior art designs, and using a prism made of flint glass as an example, in FIG. 1 a twelve-sided prism P is shown with corners A, B, C, D, E, F, G, H, I, J, K, L, which refracts the rays $r^1$ and $r^2$ passing through the middle of two picture sections $a$ and $b$ of a film $f$. The rays $r^1$ and $r^2$ which are refracted as rays $r^3$ and $r^4$, must coincide at the intersection of the optical axis $x$ and the corner G. The longitudinal axis of the prism P is perpendicular to the incident rays $r^1$ and $r^2$.

The diameter of this prism can be calculated from Snell's law of refraction and basic trigonometric calculations. FIG. 2 shows the geometry for such a calculation for a twelve-sided prism given the height of the picture sections, in this example 19mm. (32 mm. film), and the refractive index of the prism 1.65. On this fragmentary view of the prism P, $n$ is a normal to the face AB, $r^1$ is the incident ray passing through the middle of picture section $a$ of the film $f$, $i$ is the angle between the incident ray $r^1$ and the normal $n$, $j$ is the angle between the normal $n$ and the refracted ray $r^3$, G is the intersection of refracted ray $r^3$, and the optical axes $x$, $n^2$ is a normal to the optical axes $x$ through the point $A^1$, $k$ is the angle between the optical axes $x$ and the refracted ray $r^3$, $l$ is the angle between the refracted ray $r^3$ and the normal $n^2$, $l^1$ is the angle between the normal $n^2$ and the normal $n$, $m$ is the angle between the optical axes $x$ and the normal $n^2$, $m^1$ is the angle between the optical axes $x$ and the normal $n^2$ in the triangle $AA^1A^2$. $l^2$ is the angle between the normal $n^2$ and the face AB of the prism, and AG is the diameter of the prism. The refraction index of the prism in this calculation is 1.65. The given factors are: $i=15°$, the height of half the picture section $a$ is 9.5 mm., $m=90°$, $m^1=90°$, $l^2=15°$, $l^1=75°$. From these given factors the angle $j$, angle $k$, and the diameter AG can be calculated as follows:

$$\frac{\sin i\ (15°)}{\text{refr. index } (1.65)} = \sin j = \frac{0.2588}{1.65} = .1568$$

$j=9°01'$
$l=l^1+j=75°+9°01'$
$l=84°01'$

In triangle $A^1A^2G$ the angles are: $l=84°01'$; $m=90°$; and $k=180-(84°01'+90°)=5°59'$. The size of side $$A^1A^2=9.5\text{ mm.}$$

Calculation of the length of $A^2G$ $$A^2G = \frac{\cos k}{\left(\frac{\sin k}{9.5}\right)} = \frac{0.99453}{\left(\frac{0.1042}{9.5}\right)} = \frac{0.99453}{0.01096} = 90\text{ mm.}$$

In the triangle $AA^1A^2$ the angles are: $m^1=90°$; $l^2=15°$; and $m^2=75°$. The size of side $A^1A^2=9.5$ mm.

Calculations of the side $AA^2$ $$AA^2 = \frac{\sin l^2}{\left(\frac{\cos l^2}{9.5}\right)} = \frac{0.2588}{\left(\frac{0.9659}{9.5}\right)} = \frac{0.2588}{0.1016} = 2.54\text{ mm.}$$

size of the necessary diameter of the prism:

$$AG = AA^2 + A^2G = 2.54 + 90 = 92.54\text{ mm.}$$

FIG. 3 shows the calculation of the height of the faces of the prism, where AG is the diameter of the prism (92.54 mm.), AO is the radius of the prism, $n$ is a normal through O to the face AB of the prism, $i=15°$, $m^2=75°$, and $q=90°$.

From which the calculation of the face AB is:

$$\sin i = \frac{1/2 AB}{AO} = \frac{1/2 AB}{46.17}$$

$AB = 2(46.27)\ (\sin 15°) = 92.54\ (0.2588)$
$AB = 23.9$ mm.

In view of these calculations, it is apparent that the relation between the diameter (and therefore the size of the faces of the prism), and the height of the picture sections is exactly determined by the number of faces and the refractive index of the material from which the prism is made, and that there is only one acceptable diameter for every prism, according to the number of prism faces, which will meet the aforementioned requirements. It is further apparent that where the incident rays are perpendicular to the prism longitudinal axis and where the reflective index of the prism material is 1.65, as in the sample calculations above, the height of the prism faces will be greater than the height of the picture sections. In fact with the refractive indices of the available materials (Plexiglas 1.49, borosilicate crown-glass 1.51, flint glass 1.65) the size of the prism faces always will be larger than the height of the picture section.

As stated above, this unavoidable fact caused problems, and compensators of this type produced objectionable optical errors, flickering, abberations or dead spots, during the opening and closing periods of a picture cycle, because a true synchronization between the linear speed of the film and the circumferential speed of the prism was impossible.

The problem can be further illustrated by calculating the diameter of a prism having face heights equal to the height of the picture frames (19 mm). Referring to FIG. 3, the diameter AG of the prism is calculated as follows:

$$AG = 2 \times AO = 2 \times \frac{1/2 AB}{\sin i} = \frac{19}{\sin 15°}$$

$$= \frac{19}{0.2588} = 73.4\text{ mm.}$$

It can be seen from these calculations that where the heights of the prism faces are equal to the height of the picture sections, and the prism longitudinal axis is perpendicular to the incident rays, the prism diameter AG (73.4 mm.) is less than is necessary for the rays $r^3$ and $r^4$ to converge at the opposite corner G, it having been shown that the necessary diameter is 92.54 mm.

This invention solves these problems by inclining the prism longitudinal axis at an angle to the incident rays, as shown in FIGS. 4 and 10, effectively increasing the prism diameter without increasing the height of the prism faces.

Referring now to FIG. 4, this movie projector 20 has a closed housing 21 of any suitable shape with various walls and brackets that serve as mounts and will be described in connection with the description of different components of the projector. The housing 21 is mounted on a base 22. The housing supports a film transport mechanism, most of which is not shown in the drawings, but which may include the usual feed and takeup reels for film, idler wheels, and the like, and which includes a sprocket drive wheel 24. Conventional movie film 25, having the usual rows of holes 26 to be engaged by the sprocket teeth 27 of the sprocket wheel 24, is used with the projector 20. There is a window 29 defined by a pair of spaced plates 30 and 31 supported by the housing 21 past which successive frames 32 of the film move as the film is driven by the sprocket wheel 24, the film being guided between the two plates 30 and 31.

Suitable conventional lenses are used with the projector 20, examples 34 and 35 of such lenses being shown supported by the housing 21. Since this optical compensator may be used in conjunction with a projector, camera, or viewer, the kinds of lenses used would be those appropriate to the specific application of the optical compensator. The housing may also have a conventional shutter mechanism to adapt the compensator to use with a camera. For purposes of illustration, this optical compensator is described and illustrated in conjunction with a movie projector. As such, a lens 34 is mounted in a mount 36 fastened to the housing 21 and having an internally threaded tube 37 leading forwardly of it. The other lens 35 is mounted in a mount 38 that has a rearwardly extending tube 39 threaded into the tube 37, thereby permitting the focusing of the lens 35 in the usual manner.

A multi-faced prism 42 used as compensator is rotatably mounted on a pair of shafts 43 and 44, the shafts 43 and 44 being supported by blocks 45 and 46 attached to side walls 47 and 48 of the housing 21. In the projector of FIG. 4, the compensator prism 42 has twelve faces 49, 50, 51, 52, 53, 54, 55, 56, 57, 58, 59 and 60. However, the prism may have any desired number of faces, so long as opposite faces are parallel to one another, such as the faces 49 and 55 of the prism 42.

As shown in FIG. 6, the prism 42 has a plate 61 and a gear 62 fastened to it by a plurality of bolts 63, and a conventional ball bearing assembly 64 is mounted between the hub 65, the gear 62, and the shaft 43. Another plate 66 and a bevel gear 67 are mounted against the side 69 of the prism 42 by a plurality of bolts 70. The bolts 70 also mount a sleeve 71, and a conventional ball bearing assembly 72 is fitted between the sleeve 71 and the shaft 44.

As shown in FIG. 4, the shafts 43 and 44 are disposed to mount the prism 42 with its axis at an angle to the plane of the film frame 32 and to the axes of the lenses 34 and 35. The manner of determining the angle of this prism axis will be described hereinafter.

Both the prism 42 and the film drive sprocket wheel 24 are driven by a single motor 75 that has a gear 76 mounted to its output shaft 77. The gear 76 is in mesh with and drives the gear 62 to rotate the prism 42.

On the other side of the prism 42, a bevel gear 78 is mounted on a shaft 79 that is journaled between a bearing block 80 mounted on the base 22 and a bracket 81. The bracket 81 also has a vertical flange 82 to help support the shaft 44 and is mounted between front and rear walls 83 and 84 of the housing 21. The bevel gear 78 is in mesh with the bevel gear 67 and is therefore rotated to rotate the shaft 79 when the prism 42 rotates.

Another bevel gear 86 is mounted on the shaft 79 and it meshes with a bevel gear 87 that is mounted on a shaft 88 journaled between a horizontal bracket 89 and the side wall 48 of the housing 21. A gear 90 is also mounted on the shaft 88. The gear 90 meshes with an idler gear 91 mounted on the shaft 92 between the horizontal bracket 89 and the side wall 48 of the housing 21. The idler gear 91 meshes with another gear 93. The gear 93 is mounted on a shaft 94 that is journaled in the side wall 48 and extends through an opening 95 in the bracket 89 and is journaled in a wall 96 extending alongside the plates 30 and 31. The film drive sprocket wheel 24 is also mounted on the shaft 94.

A triangular prism 98 is mounted in suitable brackets 99 and 100 that are fastened to the walls 82 and 95 between the film frame window 29 and the prism 42. The triangular prism 98 has a flat face 101 parallel to the plane of the film frame 32 and has an inclined face 102. Another triangular prism 104 is mounted between a pair of brackets 105 and 106 that are supported by the housing 21 between the prism 42 and the lenses 34 and 35. The triangular prism 104 has a flat face 107 that is perpendicular to the axes of the lenses 34 and 35 and has an inclined face 108.

Finally, a conventional projector lamp and lens system is mounted within an extension 111 of the housing 21. From this light source the regularly used parallel light rays emerging and passing through the projection window and the moving film intersect the prisms 98, 42 and 104.

The prisms may be made of any of the aforementioned materials, but Plexiglas is preferred, because of the simplicity in the manufacturing of such prisms and therefore of the lower cost.

In this invention, the proper effective diameter of the prism 42 is achieved by adjusting the axis of the prism 42 at an angle to the rays passing through the film frame 32 and the prism 42. The solution providing the necessary effective diameter for the prism 42 is also aided by the provision of the triangular prisms 98 and 104. As shown in FIG. 4, light rays 126 and 127 on the left and right sides of the picture frame 32 and a central light ray 128 pass through the triangular prism 98. Since these rays 126, 127 and 128 approach the face 101 of the prism 98 at right angles, they are not refracted as they pass through the prism. However, upon reaching the inclined face 102, the rays 126, 127 and 128 are refracted to produce the rays 129, 130 and 131, respectively, which approach the prism 42 at an angle that is greater than the inclined angle of the axis of the prism. Contact of the rays 129, 130 and 131 with the prism 42 produces refracted rays 132, 133 and 134, respectively, that pass through the prism at an acute angle to the axis of the prism as shown in FIG. 4, thereby increasing the effective diameter of the prism 42 relative to the rays 132, 133 and 134. When the rays 132, 133 and 134 reach the opposite face or faces of the prism 42, they emerge as further refracted rays 135, 136 and 137, respectively, that contact the inclined face 108 of the prism 104 and are refracted to rays 138, 139 and 140. Since the angle between the faces 107 and 108 of the prism 104 is equal to the angle between the faces 101 and 102 of the prism 98, the rays 138, 139 and 140 are refracted to directions that are parallel to the axes of the lenses 34 and 35. Also, even though the width of the image may have been narrowed by the various refracted rays, it is re-established in the rays 138, 139 and 140 to exactly the same width as was provided by the rays 126, 127 and 128 emerging from the movie frame 32.

While the drawing does not show the exact angle of travel of the rays 132, 133 and 134 through the prism 42, it illustrates the concept. FIG. 10 is a cross-sectional, fragmentary, schematic view parallel to one of the rays 132, 133, and 134 and illustrates the effect of inclining the prism 42. The inclination increases the effective diameter of the prisms so that the rays 132, 133, and 134 all intersect with the corner G. This is accomplished while keeping the heights of the prism faces equal to the heights of the picture sections. In this regard notice that the effective diameter AG is greater than the actual diameter JD. Also notice that the height of the picture section 145 is equal to the height of the prism face AB. In FIG. 10 the triangular prisms 98 and 104 are not shown and it is assumed that the angle of the prism 42 is such as to establish an effective prism diameter to produce the foregoing result.

To determine the appropriate angle of inclination of the prism 42, the prism 42 is positioned with its longitudinal axis approximately perpendicular to the incident rays and then rotated about its transverse axis until the light rays passing through the middle of two neighboring picture sections of the film coincide in the opposite corner at a moment when two opposite corners of the prism intersect with the optical axis of the projection. For example where the refraction index of the prism material is 1.65, this condition will occur at an angle of inclination of approximately 45°.

It can now be understood how the triangular prisms 98 and 104 might be eliminated, and also how they aid in the efficient construction of the optical compensator. To eliminate the prisms 98 and 104, it is necessary to further rotate the axis of the prism 42 to an orientation which would have the rays 129, 130 and 131 parallel to the rays 126, 127 and 128, for without the prism 98, there would be no refraction between these two sets of rays. Such an orientation of the prism 42 would then have the rays 129, 130 and 131 intersecting the faces of the prism 42 at the required angle. Likewise, since the rays 135, 136 and 137 are always parallel to the rays 129, 130 and 131, this reorientation of the prism axis would put the rays 135, 136 and 137 parallel to the axis of the lenses 34 and 35.

The disadvantage of eliminating the prisms 98 and 104 is that, with the larger inclined angle of the axis of the prism 42, a longer prism 42 must be used, requiring the wider housing 21 and more expensive prism construction. By the use of the prisms 98 and 104, the angle of inclination between the axis of the prism 42 and the plane of the film can be reduced, depending upon the materials used for the prisms 98 and 104. Preferably, the triangular prisms 98 and 104 are also made of Plexiglas to take advantage of the lower manufacturing cost of the prisms.

OPERATION

The manner of determining the relationship between the angle of the axis of the prism 42, with or without the triangular prisms 98 and 104, has now been described. In the operation of the optical compensator 20, the motor 75 drives both the prism 42 and the film drive sprocket wheel 24. Operation of the motor 75 rotates the gear 76 to rotate the gear 62 and thereby rotate the prism 42. Rotation of the prism 42 causes rotation of the gear 67, which drives the gear 78 and rotates the shaft 79. As shown in FIG. 8, rotation of the shaft 79 causes rotation of the gear 86 which in turn drives the bevel gear 87 and rotates the gear 90. The gear 90 causes the idler gear 91 to rotate, thereby driving the gear 94 and rotates the shaft 79 on which the film drive sprocket wheel 24 is mounted. The number of teeth on the various gears are selected to cause the speeds of rotation of the prism 42 and the film drive sprocket wheel 24 to be such that the circumferential speed of the faces 49–60 of the prism 42 is the same as the linear speed of the film 25. The movement of the prism 42 and the film 25 is continuous and uninterrupted, and the projected image is steady and non-flickering.

Various changes and modifications may be made within the purview of this invention as will be readily apparent to those skilled in the art. Such changes and modifications are within the scope and teaching of this invention as defined by the claims appended hereto.

What is claimed is:

1. An optical compensator comprising a housing, a prism rotatably supported within the housing, the prism having diametrically opposite mutually parallel faces of equal height as measured transverse to the prism axis, a movie film, means to move the movie film through the housing, the movie film having successive frames each having a height equal to the height of the prism faces, a lens assembly in a side of the housing, the prism being positioned in the path of light rays between the film and the lens assembly, the prism being mounted at an angle to cause the light rays between the film and the prism to intersect the prism faces at an acute angle to the longitudinal axis of the prism.

2. The optical compensator of claim 1 including identical prisms between the rotatable prism and the film and between the rotatable prism and the lens assembly, the identical prisms having angular faces to direct light rays at an acute angle to the longitudinal axis of the rotatable prism.

3. The optical compensator of claim 2 wherein the longitudinal axis of the rotatable prism is at an acute angle to the plane of that portion of the film which light rays intersect.

4. The optical compensator of claim 1 wherein the rotatable prism is of equilateral cross-section and has an even number of faces.

5. The optical compensator of claim 4 including single drive means for rotating the prism and moving the film.

6. The optical compensator of claim 5 including a gear train for causing the linear speed of the faces of the rotatable prism to be equal to the linear speed of the film.

7. The optical compensator of claim 1 wherein the rotatable prism has a refractive index between 1.49 and 1.65.

8. The optical compensator of claim 2 wherein the rotatable prism and the identical prisms have refractive indices between 1.49 and 1.65.

9. The optical compensator of claim 1 wherein the angle of incidence of each of the light rays to the faces of the rotatable prism relative to its longitudinal axis is such that the upper and lowermost incident rays are each refracted to intersect with the opposite corner of the rotatable prism.

10. The optical compensator of claim 9 wherein the rotatable prism is of equilateral cross-section and has an even number of faces, and including means for rotating the rotatable prism and moving the film so that the linear speed of the faces of the rotatable prism is equal to the linear speed of the film, and so that each of the corners of the rotatable prism are successively aligned with a space between two adjacent picture frames positioned in the path of the light rays as the film moves through the film window.

11. An optical compensator comprising a housing, a multi-faced prism rotatably supported within the housing, means to rotate the prism, a movie film having picture sections or frames equal in height to the height of the prism faces, means to move the movie film through the housing at a speed equal to the surface speed of the rotating prism, and means inclining the longitudinal axis of the prism to the path of incident light rays to increase the effective diameter of the prism measured in the path of the refracted light rays passing through the prism in correspondence to the refractive index of the prism.

References Cited
UNITED STATES PATENTS

| | | | |
|---|---|---|---|
| 1,840,799 | 1/1932 | Waddell | 352—113 |
| 2,298,045 | 10/1942 | Ehrenhaft | 352—119 |
| 2,972,280 | 2/1961 | Kudar | 178—7.6X |

JOHN M. HORAN, Primary Examiner

M. H. HAYES, Assistant Examiner

U.S. Cl. X.R.

350—6, 285